V. E. EDWARDS & J. R. GEORGE.
CONVEYER FOR METAL RODS.
APPLICATION FILED JULY 5, 1910.
1,031,057.
Patented July 2, 1912.
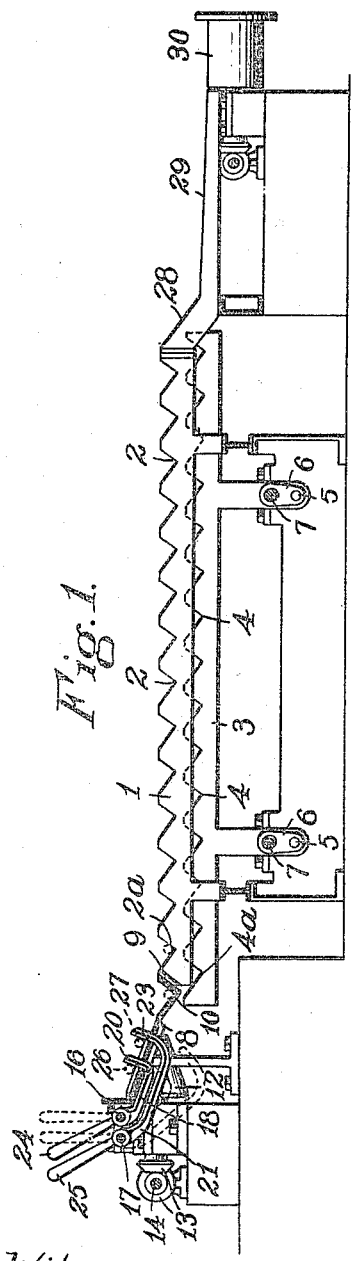
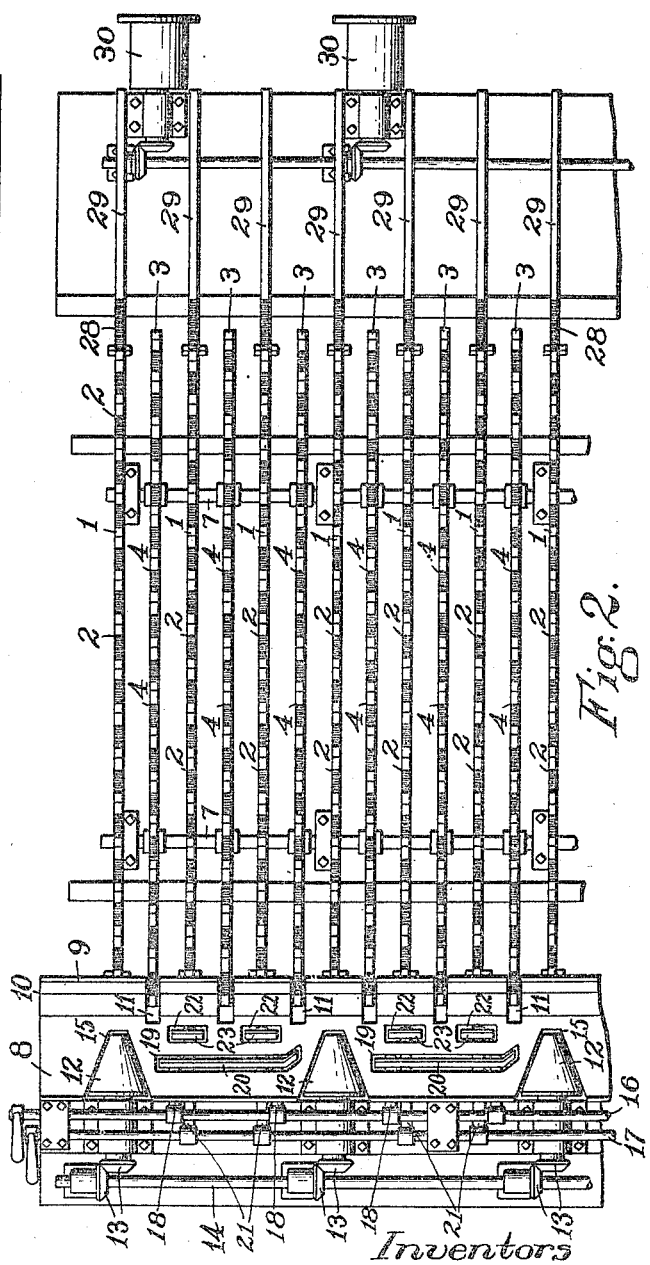
Witnesses
R. D. Tolman
Penelope Comberback
Inventors
Victor E. Edwards
Jerome R. George
By Rufus B. Fowler
Attorney

UNITED STATES PATENT OFFICE.

VICTOR E. EDWARDS AND JEROME R. GEORGE, OF WORCESTER, MASSACHUSETTS, ASSIGNORS TO MORGAN CONSTRUCTION COMPANY, OF WORCESTER, MASSACHUSETTS, A CORPORATION OF MASSACHUSETTS.

CONVEYER FOR METAL RODS.

1,031,057.  Specification of Letters Patent.  Patented July 2, 1912.

Application filed July 5, 1910. Serial No. 570,384.

*To all whom it may concern:*

Be it known that we, VICTOR E. EDWARDS and JEROME R. GEORGE, citizens of the United States, residing at Worcester, in the county of Worcester and Commonwealth of Massachusetts, have invented a new and useful Improvement in Conveyers for Metal Rods, of which the following is a specification, accompanied by drawings forming a part of the same.

Our invention relates to that class of conveyers adapted to receive a metal rod from a rolling mill by a longitudinal movement of the rod and to convey the same by a sidewise movement, having means for supporting the rods during said sidewise movement and during the period of cooling.

In the present instance we have shown our invention as embodied in a conveyer having a series of stationary supporting bars provided with notches in alinement, in which the heated metal rods are supported and straightened during the process of cooling, and a series of movable notched bars by which the heated metal rods are moved forward by a sidewise step-by-step movement from one line of notches to the next succeeding line.

Our present invention relates to the means for controlling the movement of the heated rods as they are delivered to the mechanism for transferring them by a sidewise step-by-step movement, and our invention consists in the construction and arrangement of parts by which this is accomplished as hereinafter described and pointed out in the annexed claims.

In the accompanying drawings Figure 1 represents a side view of a portion of a conveyer embodying our invention. Fig. 2 is a plan view of that part shown in Fig. 1.

Similar reference characters refer to similar parts in the different figures.

Referring to the accompanying drawings, 1 denotes a series of parallel stationary supporting bars provided with angular notches 2, each set of notches in the bar 1 being arranged in alinement to enable the heated metal rods, as they are moved forward by a step-by-step movement, to rest in the notches 2.

3 denotes a series of parallel movable bars having notches 4. The movable bars 3 are carried upon crank pins 5 in cranks 6 which are attached to rotating shafts 7, 7, so that the bottom of each of the notches 4, 4 will travel through a circular path corresponding to the path of the crank pins 5.

At the receiving end of the notched bars 1 we mount a stationary inclined plate 8, having at its lower edge an upturned flange 9 forming an angular trough 10 which is substantially continuous throughout its entire length, being only broken by the notches 11, 11 which provide for the movement of the movable bars 3.

In the supporting framework of the conveyer are journaled conical conveyer rolls 12 in alinement with each other and positively driven through a geared connection 13 from a common driving shaft 14. The conveyer rolls 12 are arranged to receive a rod or bar from a rolling mill by a longitudinal movement across the peripheries of the conveyer rolls. The upper surfaces of the conveyer rolls 12 project slightly through openings 15 in the plate 8, to enable the rod or bar to be longitudinally moved by contact with the rolls. As the rolls 12 are conical, their peripheral speed, and consequently the longitudinal speed of the rods resting thereon, will vary with different planes of rotation. The axes of the rolls 12 are substantially horizontal so as to incline the supporting surface of the rolls at a sufficient angle to allow gravity to move the rods sidewise toward the smaller ends of the rolls whenever the rods are released by the stop mechanism hereinafter described.

Journaled in bearings adjacent to the plate 8 are rocking shafts, in the present instance two in number, 16 and 17. To the shaft 16 are attached at suitable intervals arms 18, having their free ends bent at substantially right angles and adapted to be extended through openings 19 in the plate 8 and form stops 20 above the plane of the supporting surfaces of the rolls 12. To the shaft 17 are similarly attached arms 21, with their free ends bent at substantially right angles and adapted to be extended through openings 22 in the plate 8 and form similar stops 23 above the plane of the supporting surfaces of the rolls 12. The rocking shafts 16 and 17 are provided with lever handles 24 and 25, which enable the shafts to be rocked by an attendant for the purpose of bringing the stops 20 and 23 into the position shown in Fig. 1, in which the stop 20 serves to prevent the sidewise sliding movement of a rod, in the position indicated by the broken line 26, on the conical conveyer rolls 12, and the stop 23 similarly serves to prevent the sidewise sliding movement of a rod, in the position indicated by the broken line 27, on the conical conveyer rolls 12.

In the operation of our conveyer a rod is received from the rolling mill by a longitudinal movement upon the upper supporting surfaces of the conical conveyer rolls 12, and near their larger ends where the peripheral speed of the rolls 12 is substantially equal to the longitudinal movement of the rod. The stop 20, when brought into the position shown in Fig. 1, serves to prevent the downward sidewise sliding movement of the rod past the stop 20. At a suitable period in the movement of the rod, the stop 20 is depressed by the rocking of the shaft 16, allowing the rod, which previously had rested against the stop 20, to slide down the supporting surface of the conical rolls 12 and be caught by the stop 23, bringing the rod from the position shown at 26 to the position shown at 27, or nearer the smaller ends of the rolls 12 where the peripheral speed of the rolls is decreased, causing a subsequent decrease in the speed of the longitudinal movement of the rod. The stop 20 is then restored to its normal position, as shown in Fig. 1, and a succeeding rod received upon the rolls 12 while the first rod is still resting upon the rolls 12 and is being brought by a slow movement to the end of its longitudinal travel, thereby overcoming the momentum imparted by its quick initial movement. At the proper period in the movement of the rod, in its position shown at 27, the stops 23 are depressed, allowing the rod to slide downward over the plate 8 into the trough 10, from which it is picked up by the notch 4ᵃ in the movable bars 3 and carried into the first notch 2ᵃ of the stationary bars 1, each succeeding movement of the movable bars 3 carrying the rod by a step-by-step movement across the entire length of the supporting bars 1 until it falls upon the incline 28 and rolls across the skids 29 upon the conveyer rolls 30. By the employment of two stop devices the second rod may be entered upon the rolls 12 before the first rod has completed its longitudinal movement, allowing the movement of the rods upon the rolls 12 to overlap each other. The second rod may therefore be received from the final rolls of the mill during the time that the first rod is overcoming the momentum of its quick initial movement upon the rolls 12. By placing the stop operating mechanism below the plate 8 instead of above it, the space above the plate is left free for the manipulation of the rods, and the movement of the stop members 20 and 23 is in a plane substantially at right angles to that of the plate 8, thereby avoiding any interference in the respective paths of the rods.

We claim,

1. In a conveyer for metal rods, a series of conveyer rolls having their upper surfaces inclined and arranged to receive a rod from a rolling mill by a longitudinal movement, a rod supporting plate between said conveyer rolls having its upper surface substantially parallel with the plane of the upper inclined roll surfaces, openings in said plate, a stop mechanism extending through said openings above the plane of the supporting surfaces of said conveyer rolls, and means for depressing said stop mechanism below the plane of said supporting plate.

2. In a conveyer for metal rods, a series of conical conveyer rolls for receiving the rods from a rolling mill by a longitudinal movement, said rolls having their upper surfaces inclined to permit a sidewise movement of the rods by gravity, a rod supporting plate placed between adjacent rolls in said series of conveyer rolls, with the upper surface of said plate parallel with and slightly below the plane of the supporting surfaces of the rolls, and provided with an opening, a stop device for preventing the sidewise movement of the rods by gravity, and means for imparting an up and down movement to said stop device through said opening.

3. In a conveyer for metal rods, a series of conical conveyer rolls having their upper surfaces inclined to permit a sidewise movement of the rods by gravity on said rolls, a rod supporting plate placed between adjacent rolls of said series and provided with an opening, and a stop device for limiting the sidewise movement of the rods on said rolls, comprising a rocking shaft, a radial arm carried by said shaft and having its free end upturned and adapted to pass through said opening.

4. In a conveyer for metal rods, a series of conical conveyer rolls having their upper surfaces inclined to permit a sidewise movement of the rods by gravity, means for rotating said rolls, a rod supporting plate between adjacent rolls of said series having its upper surface slightly below and substantially parallel with the plane of the upper supporting surfaces of said rolls, a stop device for preventing the sidewise movement of the rods on said rolls by gravity, normally held above the plane of the supporting surface of said plate, and means for depressing said stop device below the supporting surface of said plate.

5. In a conveyer for metal rods, a series of conical conveyer rolls arranged to receive a rod from a rolling mill by a longitudinal movement and having their upper surfaces inclined from a horizontal plane, a rod supporting plate between adjacent rolls of said series, retaining means for holding a rod on said inclined roll surfaces in a predetermined position, and means for depressing said retaining means below the supporting surface of said plate to permit a sidewise movement of the rods.

6. In a conveyer for metal rods, a series of conveyer rolls having their upper surfaces inclined from a horizontal plane, means for rotating said rolls, and two or more retaining mechanisms at predetermined points for preventing the sidewise movement of the rods by gravity on said rolls.

7. In a conveyer for metal rods, a series of conveyer rolls having their upper surfaces inclined from a horizontal plane, means for rotating said rolls, a rod supporting plate between adjacent rolls of said series, and means for simultaneously retaining rods upon said rolls in different vertical planes.

8. In a conveyer for metal rods, a series of conveyer rolls having their upper surfaces inclined from a horizontal plane, means for rotating said rolls, means for retaining rods upon the supporting surfaces of said rolls in different vertical planes, and means for releasing the rods.

9. In a conveyer for metal rods, a series of conical conveyer rolls having their upper surfaces inclined from a horizontal plane, means for rotating said rolls, and independent means for retaining rods in different positions on said rolls.

10. In a conveyer for metal rods, a series of conical conveyer rolls having their upper surfaces inclined from a horizontal plane, means for rotating said rolls, means for retaining a rod on said rolls in two predetermined positions, and means for independently releasing a rod from either of said positions.

Dated this 25th day of June 1910.
VICTOR E. EDWARDS.
JEROME R. GEORGE.

Witnesses:
W. A. WINN,
M. OLIVE CROSS.